US008816898B2

(12) United States Patent
Shirakawa (10) Patent No.: US 8,816,898 B2
(45) Date of Patent: Aug. 26, 2014

(54) RADAR APPARATUS

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 13/095,535

(22) Filed: Apr. 27, 2011

(65) Prior Publication Data

US 2011/0273326 A1   Nov. 10, 2011

(30) Foreign Application Priority Data

May 10, 2010 (JP) ................................. 2010-108374

(51) Int. Cl.
*G01S 13/42* (2006.01)
*G01S 7/40* (2006.01)
*G01S 13/89* (2006.01)

(52) U.S. Cl.
CPC ................ *G01S 13/42* (2013.01); *G01S 13/89* (2013.01); *G01S 7/40* (2013.01)
USPC .......................................... 342/147; 342/174

(58) Field of Classification Search
USPC ................................................ 342/25 R, 147
See application file for complete search history.

(56) References Cited

U.S. PATENT DOCUMENTS

| | | | |
|---|---|---|---|
| 7,109,911 B1 * | 9/2006 | Cataldo | 342/25 R |
| 7,196,656 B2 | 3/2007 | Shirakawa | |
| 7,714,782 B2 * | 5/2010 | Davis et al. | 342/377 |
| 7,859,450 B2 | 12/2010 | Shirakawa et al. | |
| 7,999,724 B2 * | 8/2011 | Cho | 342/25 A |
| 2005/0195103 A1 * | 9/2005 | Davis et al. | 342/99 |
| 2008/0122681 A1 * | 5/2008 | Shirakawa | 342/147 |
| 2010/0086228 A1 * | 4/2010 | Cho et al. | 382/255 |
| 2010/0156701 A1 | 6/2010 | Shirakawa | |

FOREIGN PATENT DOCUMENTS

| | | |
|---|---|---|
| JP | 2006-98181 A | 4/2006 |
| JP | 2009-80024 A | 4/2009 |
| JP | 2010-71653 A | 4/2010 |
| JP | 2010-71889 A | 4/2010 |

OTHER PUBLICATIONS

Extended European Search Report dated Sep. 9, 2011 for corresponding European Application No. 11164914.1.
Amar et al., "A Low Complexity Blind Estimator of Narrowband Polynomial Phase Signals," IEEE Transactions on Signal Processing, vol. 58, No. 9, Sep. 1, 2010, pp. 4674-4683.

(Continued)

*Primary Examiner* — Matthew M Barker
(74) *Attorney, Agent, or Firm* — Fujitsu Patent Center (57) ABSTRACT

A radar apparatus includes: an array antenna having antenna elements having function of a transmission antenna and a reception antenna and receiving an echo signal which is a reflection of a probe signal from a target, the probe signal being radiated from the antenna elements; a converter for converting the echo signal to a baseband signal; a signal synthesizing unit which generates a synthesized baseband signal vector on the basis of aperture synthesis of the baseband signal generated from a combination of the antenna elements giving an equal spatial phase; a correction data acquiring unit which acquires correction data on the basis of coefficients of terms of a synthesized array polynomial; a correction processing unit which corrects the synthesized baseband signal vector on the basis of the correction data; and an estimating unit which performs angle estimation on the basis of the synthesized baseband signal vector.

4 Claims, 8 Drawing Sheets

(56) References Cited

OTHER PUBLICATIONS

Brown et al., "A Phased Array Calibration Technique Using Eigenstructure Methods," IEEE International Radar Conference, May 7, 1990, pp. 304-308.

Wang et al., "Robust DOA estimation and array calibration in the presence of mutual coupling for uniform linear array," Science in China Ser. F Information Sciences, vol. 47, No. 3, Jan. 1, 2004, pp. 348-361.

Weiss et al., "Comparison for Signal Estimation Using Calibrated and Uncalibrated Arrays," IEEE Transactions on Aerospace and Electronic Systems, vol. 33, No. 1, Jan. 1, 1997, pp. 241-249.

Zeira et al., "On Blind Signal Copy for Polynomial Phase Signals," IEEE International Conference on Acoustics, Speech, and Signal Processing, vol. 5, Apr. 21, 1997, pp. 4045-4048.

Japanese Office Action mailed Nov. 5, 2013 for corresponding to Japanese Application No. 2010-108374, with Partial English-language Translation.

* cited by examiner

RADAR APPARATUS

CROSS-REFERENCE TO RELATED APPLICATION

This application is based upon and claims the benefit of priority of the prior Japanese Patent Application No. 2010-108374 filed on May 10, 2010, the entire contents of which are incorporated herein by reference.

FIELD

The embodiments discussed wherein are related to detection and ranging apparatuses and target detection methods using aperture synthesis.

BACKGROUND

Some detection and ranging apparatuses may use a technology which combines a transmission sensor array including a plurality of transmission sensor elements and a reception sensor array including a plurality of reception sensor elements to effectively enlarge the aperture of the reception sensor array. Hereinafter, a radar apparatus will be described as a concrete example of a detection and ranging apparatus. The technology described above may be called holographic aperture synthesis, holograph, aperture synthesis, synthesis aperture or the like.

A radar apparatus using aperture synthesis radiates a probe signal modulated by an arbitrary method from a plurality of transmission sensor elements at time slots assigned to transmission sensors by time division multiplexing, for example. An echo signal caused by the reflection of the probe signal by a detection target is received by a plurality of reception sensor elements. The radar apparatus synthesizes the reception signals acquired at the time slots assigned to the transmission sensors. As a result, the radar apparatus can have an increased number of effective reception sensor elements and can detect an increased number of targets, thus improving the angular resolution. Hereinafter, a radar apparatus using aperture synthesis will be called an aperture synthesis radar. A sensor element and a sensor array are not distinguished from an antenna (element) and an array antenna, respectively. Reference may be made to Japanese Laid-open Patent Publication No. 2009-80024 and U.S. Pat. No. 7,196,656.

SUMMARY

According to an aspect of the embodiment, a radar apparatus including: an array antenna having a plurality of antenna elements having function of a transmission antenna and a reception antenna and receiving an echo signal which is a reflection of a probe signal from a target, the probe signal being output from the antenna elements at a predetermined timing; an A/D converter for converting the echo signal to a baseband signal; a signal synthesizing unit which generates a synthesized baseband signal vector on the basis of aperture synthesis of the baseband signal generated from a combination of the antenna elements giving an equal spatial phase; a correction data acquiring unit which acquires correction data on the basis of coefficients of terms of a synthesized array polynomial obtained from product of an array polynomial of the transmission antenna and an array polynomial of the reception antenna; a correcting unit which corrects the synthesized baseband signal vector on the basis of the correction data; and an estimating unit which performs angle estimation on the basis of the synthesized baseband signal vector corrected by the correcting unit.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, according to an embodiment, a concrete example of a radar apparatus which uses FMCW (Frequency Modulated Continuous Wave) as a probe signal (hereinafter simply called a radar apparatus) will be described. A radar apparatus according to an embodiment may be mounted in a vehicle, for example. However, a radar apparatus according to an embodiment does not limit the object, apparatus and system in which the radar apparatus is to be mounted. The following embodiments are given for illustration purpose only, and the present disclosure is not limited by the configurations of the following embodiments.

[Apparatus Configuration]

Figure 1:
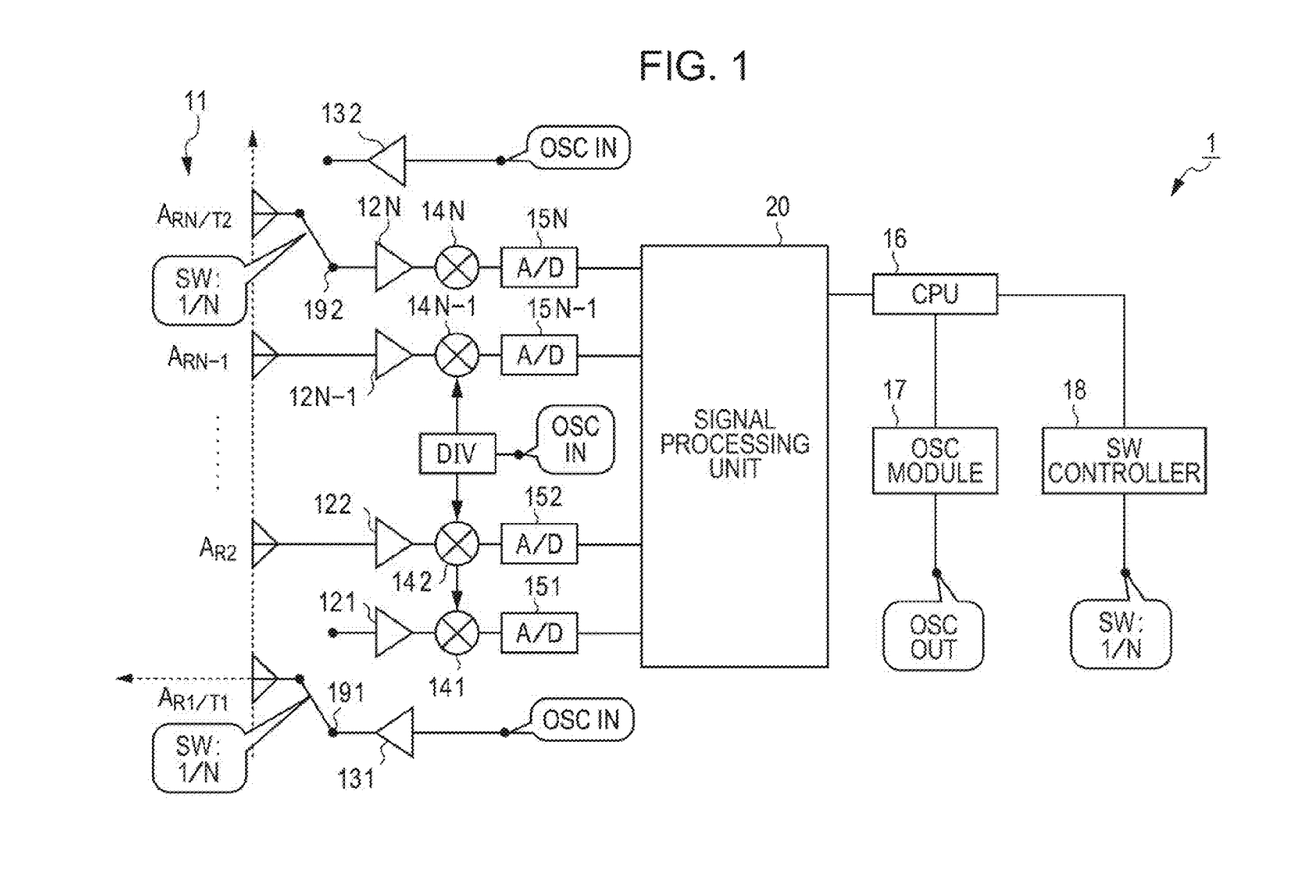
FIG. 1 is a block diagram illustrating a configuration example of a radar apparatus according to an embodiment.

FIG. 1 is a block diagram illustrating a configuration example of a radar apparatus according to an embodiment. A radar apparatus 1 according to this embodiment includes, as illustrated in FIG. 1, an array antenna 11, a low noise amplifier (hereinafter LNA) 12, a power amplifier (hereinafter HPA) 13, a mixer (MIX in FIG. 1) 14, an analog/digital (hereinafter A/D) converter 15, a signal processing unit 20, an oscillating module (OSC MODULE in FIG. 1) 17, a CPU (Central Processing Unit) 16, and a switch controller (SW CONTROLLER in FIG. 1) 18. These units are implemented by software components, hardware components, or combinations of them (refer to [Others]).

The oscillating module 17 may have a baseband oscillator and a high-frequency voltage control oscillator, for example, and outputs a system reference signal as a result of the operations of the oscillators. More specifically, a reference signal output from the baseband oscillator is fed to the high-frequency voltage control oscillator, and the reference signal is used to generate a frequency-modulated high-frequency signal as a system reference signal from the high-frequency voltage control oscillator. The reference signal may be ramp waves. Instead of the high-frequency voltage control oscillator, a current control type oscillator may be used. Instead of this kind of analog circuit configuration, the oscillating module 17 may be a module being capable of digitally and directly generating an FMCW signal, such as a DDS (Direct Digital Synthesizer).

The HPA 13 is provided in a processing line corresponding to a transmission antenna. According to the example in FIG. 1, because two antennas of $A_{T1}$ and $A_{T2}$ are used as transmission antennas, two HPAs 13 (HPA 131 and HPA 132) are provided. Each of the HPAs 13 amplifies a system reference signal output from the oscillating module 17, and the amplified signal is output as a probe signal for target detection from an antenna selected as a transmission antenna.

The array antenna 11 has N antenna (sensor) elements which are disposed in different space positions. For example, the array antenna 11 forms a ULA (Uniform Linear Array, or simply called Uniform Array hereafter) antenna in which the antenna elements are aligned straight at equal intervals. In the example in FIG. 1, two antenna elements at both ends of the antenna elements aligned straight are shared for transmission and reception, and the other antenna elements are only used for reception. Hereinafter, an antenna element to be shared for transmission and reception will be called a shared antenna $A_{R1}/_{T1}$ or shared antenna $A_{RN}/_{T2}$.

In the example in FIG. 1, for convenience of description, a shared antenna may be switched for transmission or reception by a switch 19 by time division. Antenna elements which operate as reception antennas will be referred to as $A_{R1}$ to $A_{RN}$, and antenna elements which operate as transmission antennas will be referred to as $A_{T1}$ and $A_{T2}$. In this way, the radar apparatus 1 according to this embodiment uses an aperture enlarging technology which increases the number of effective reception antennas with a combination of a plurality of transmission antennas and a plurality of reception antennas.

The switch 19 switches the shared antenna between the use for transmission and the use for reception in accordance with a control signal from the switch controller 18. More specifically, the switch 191 switches the shared antenna $A_{R1}/_{T1}$ between the connection to the HPA 131 and the connection to the LNA 121. If the shared antenna $A_{R1}/_{T1}$ is connected to the HPA 131, it operates as the transmission antenna $A_{T1}$. If the shared antenna $A_{R1}/_{T1}$ is connected to the LNA 121, it operates as the reception antenna $A_{R1}$. In the same manner, the switch 192 switches the shared antenna $A_{RN}/_{T2}$ between the connection to the HPA 132 and the connection to the LNA 12N. If the shared antenna $A_{RN}/_{T2}$ is connected to the HPA 132, it operates as the transmission antenna $A_{T2}$. If the shared antenna $A_{RN}/_{T2}$ is connected to the LNA 12N, it operates as the reception antenna $A_{RN}$.

The switch controller 18 controls the switching timing of the switch 19 in accordance with transmission cycle information (P/Q) transmitted from the CPU 16 and a cycle $T_f$ (which may be also set by the CPU 16) of a reference signal output from a baseband oscillator of the oscillating module 17. The transmission cycle information (P/Q) describes a ratio (P) of a time slot for using the transmission antenna $A_{T1}$ and a ratio (Q) of a time slot for using the transmission antenna $A_{T2}$ where the cycle $T_f$ of the reference signal is one unit. For convenience of description, the duty ratio is ignored for switching the shared antennas between the use for transmission and the use for reception in one time slot.

During $PT_f(=P \times T_f)$, the switch controller 18 uses the shared antenna $A_{RN}/_{T2}$ as the reception antenna $A_{RN}$ and switches the shared antenna $A_{R1}/_{T1}$ at predetermined periods between the use as the transmission antenna $A_{T1}$ and the use as the reception antenna $A_{R1}$. Then, during the $QT_f(=Q \times T_f)$, the switch controller 18 uses the shared antenna $A_{R1}/_{T1}$ as the reception antenna $A_{R1}$ and switches the shared antenna $A_{RN}/_{T2}$ at predetermined periods between the use as transmission antenna $A_{T2}$ and the use as reception antenna $A_{RN}$.

Figure 2:
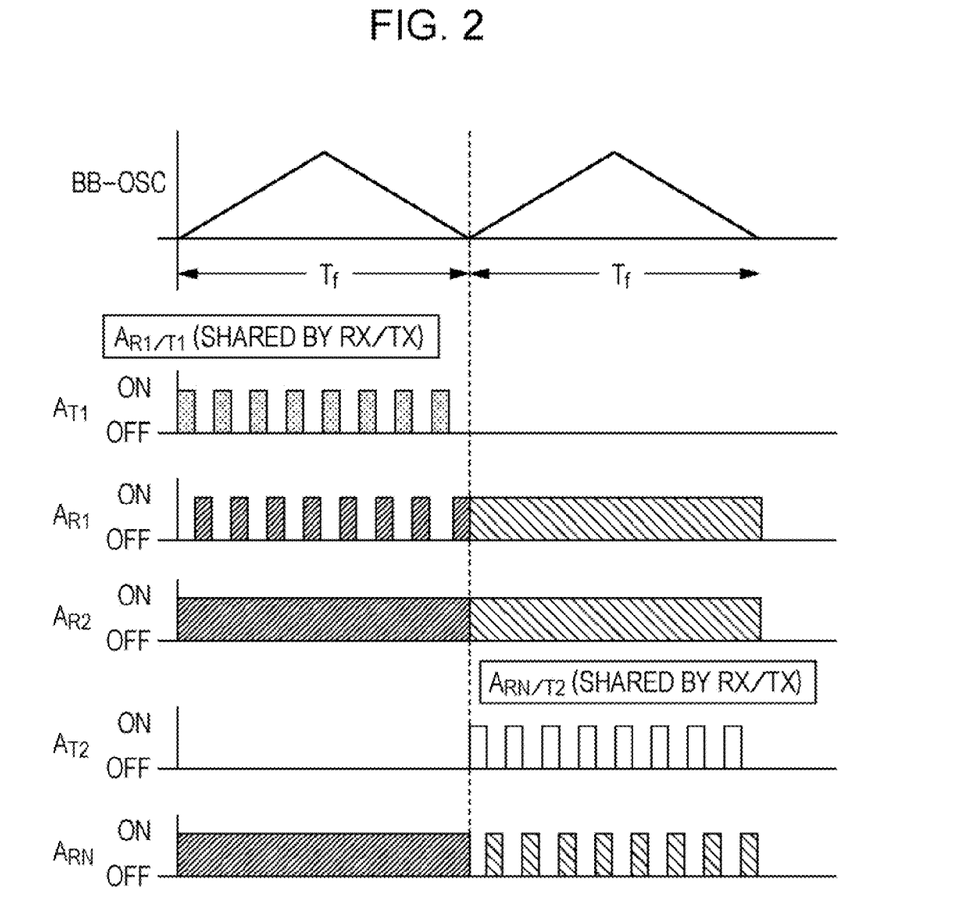
FIG. 2 is a timing chart of transmission and reception timings when transmission cycle information (P=1, Q=1) is used.

FIG. 2 is a timing chart of transmission and reception timings when transmission cycle information (P=1, Q=1) is used. In the example in FIG. 2, during $[0,T_f]$, the shared antenna $A_{R1}/_{T1}$ radiates a probe signal and receives an echo signal at predetermined periods, and the reception antenna $A_{RN}$ continuously receives an echo signal. During $[T_f, 2T_f]$, the shared antenna $A_{RN}/_{T2}$ radiates a probe signal and receives an echo signal at predetermined periods, and the reception antenna $A_{R1}$ continuously receives an echo signal. On the basis of the timing chart, one cycle of an operation by the radar apparatus 1 of this embodiment includes by a time slot $[0,PT_f]$ and a time slot $[PT_f,(P+Q)T_f]$ (where the measurement starting time is equal to 0). More specifically, in the time slot $[0,PT_f]$, the antenna $A_{R1}/_{T1}$ operates as a shared antenna, and the antennas $A_{R2}$ to $A_{RN}$ operate as reception antennas. In the time slot $[PT_f,(P+Q)T_f]$, the antenna $A_{RN}/_{T2}$ operates as a shared antenna, and the antennas $A_{R1}$ to $A_{RN-1}$ operate as reception antennas.

The LNA 12 is provided in a processing line corresponding to a reception antenna. In the example in FIG. 1, an LNA 122 to an LNA 12N-1 are connected to the reception antennas $A_{R2}$ to $A_{RN-1}$, respectively, at all times. The LNA 121 is connected to the reception antenna $A_{R1}$ in response to the switching of the switch 191. The LNA 12N is connected to the reception antenna $A_{RN}$ in response to the switching of the switch 192. The LNA 12 receives a reception signal from a reception antenna connected thereto and amplifies the reception signal. The amplified signal is transmitted to the mixer 14.

The mixer 14 is connected to the LNA 12. The mixer 14 mixes the signal amplified by the LNA 12 with the system reference signal transmitted from the oscillating module 17 to convert the high-frequency echo signal to a baseband signal. In FIG. 1, not all components such as a filter are explicitly illustrated.

The A/D converter 15 converts the baseband signal output from the mixer 14 to a digital baseband signal with a predetermined sampling frequency. Hereinafter, the digital baseband signal will be simply called a demodulated signal. Thus the demodulated signal is transmitted to the signal processing unit 20.

Figure 3:
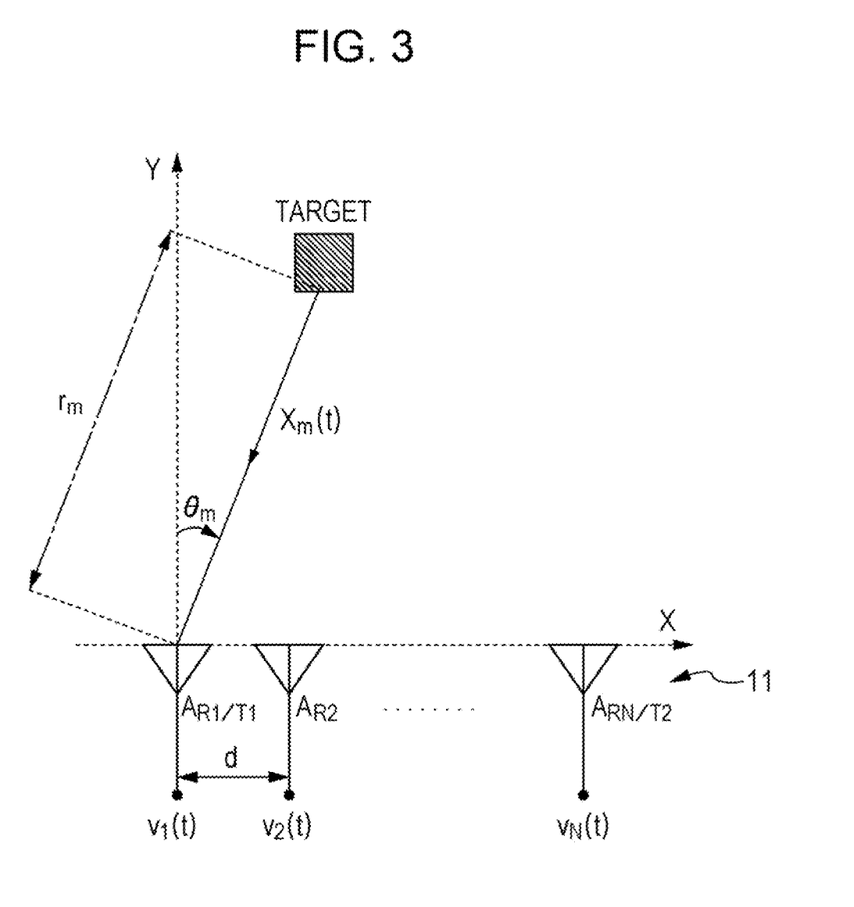
FIG. 3 is a conceptual diagram illustrating a positional relationship between a detection target and a reception sensor array.

FIG. 3 is a conceptual diagram illustrating a positional relationship between a detection target and a reception sensor array. In the example in FIG. 3, the sensor array 11 forms a uniform linear array antenna having N reception antennas at equal element intervals d. Independent M detection target (TARGET in FIG. 3) is present at the position at a distance $r_m$ and angle $\theta_m$ from the coordinate origin. The angle $\theta_m$ is an angle defined when the positive direction of the Y-axis illustrated in FIG. 3 is set to 0 degree and the clockwise of FIG. 3 is set as the positive direction. While FIG. 3 only illustrates one detection target, the maximum number M of detection targets detectable by the apparatus in FIG. 1 may be equal to or lower than $[(2N-1)/2]$, for example, where [ ] is a gauss symbol when the targets are moving at an equal distance from the apparatus and at an equal speed (in the same speed direction).

FIG. 3 illustrates that a baseband signal $x_m^{T1}(t)$ arrives at the sensor array 11 with an angle $\theta_m$. The baseband signal $x_m^{T1}(t)$ is a signal possibly resulting from the demodulation processing in the processing units as described above on an echo signal (containing the positional information on the detection target) as a result of the reflection of a probe signal radiated from the antenna $A_{R1}/_{T1}$ to a detection area by the m-th detection target. The m is one integer of 1 to M, and t is a time. Hereinafter, the baseband signal $x_m^{T1}(t)$ will be called a target echo signal.

Thus, the demodulated signal $v_n^{T1}(t)$ corresponding to the probe signal radiated from the antenna $A_{R1}/_{T1}$ to the detection area, received by the n-th antenna $A_{Rn}$ and signal processed in the processing units may be expressed by Expression (1.1). The $\phi_{n,m}^{T1}$ expressed by Expression (1.2) indicates a spatial phase reflecting the angle of a detection target, that is, the reception phase of the m-th wave at the reception antenna $A_{Rn}$, and the $n_n^{T1}(t)$ indicates the additive Gauss noise of power $\sigma^2$. The n is an integer of 1 to N (the number of physical reception antennas). Hereinafter, the demodulated signal $v_n^{T1}(t)$ expressed in Expression (1.1) will be called a synthesized echo signal.

$$v_n^{T1}(t) = \sum_{m=1}^{M} x_m^{T1}(t) \exp(j\phi_{n,m}^{T1}) + n_n^{T1}(t) \quad (1.1)$$

$$\varphi_{n,m}^{T1} \equiv -\frac{2\pi}{\lambda}(n-1)d\sin\theta_m \quad (1.2)$$

The demodulated signal $v_n^{T1}(t)$ is acquired at the time slot $[0,T_f]$ illustrated in FIG. 2. On the other hand, at the time slot $[T_f, 2T_f]$ illustrated in FIG. 2, a synthesized echo signal $v_n^{T2}(t)$ expressed by Expression (1.3) below is acquired. At the time slot $[T_f, 2T_f]$, the $A_{RN}/_{T2}$ is used as a shared antenna, and the $A_{R1}$ to $A_{RN-1}$ are used as reception antennas. Expression (1.3) is based on the following idea. That is, as described above, because the cycle of the reference signal is $T_f$, the radar apparatus 1 operates at a basic frequency of $2\pi/T_f$. Thus, the target echo signal corresponding to a probe signal radiated from the antenna $A_{RN}/_{T2}$ may be considered as $x_m^{T2}(t) \approx x_m^{T1}(t+T_f)$. Furthermore, in consideration of the basic frequency, the target echo signal may be considered as $x_m^{T1}(t+T_f) \approx x_m^{T1}(t)$. However, the spatial phase $\phi_{n,m}^{T2}$ is different from the spatial phase $\phi_{n,m}^{T1}$ since the positions of the transmission antennas being the reference points of spatial phases are different.

$$v_n^{T2}(t) = \sum_{m=1}^{M} x_m^{T1}(t+T_f) \exp(j\phi_{n,m}^{T2}) + n_n^{T2}(t+T_f) \quad (1.3)$$

$$= \sum_{m=1}^{M} x_m^{T1}(t) \exp(j\phi_{n,m}^{T2}) + n_n^{T2}(t)$$

$$\varphi_{n,m}^{T2} \equiv -\frac{2\pi}{\lambda}(n-N)d\sin\theta_m \quad (1.4)$$

The synthesized echo signals as described above are transmitted to the signal processing unit 20.

The signal processing unit 20 performs aperture synthesis processing on the synthesized echo signals, and the positional information on the detection target is estimated on the basis of the aperture synthesized signal. The signal processing unit 20 will be described in detail below.

Figure 4:
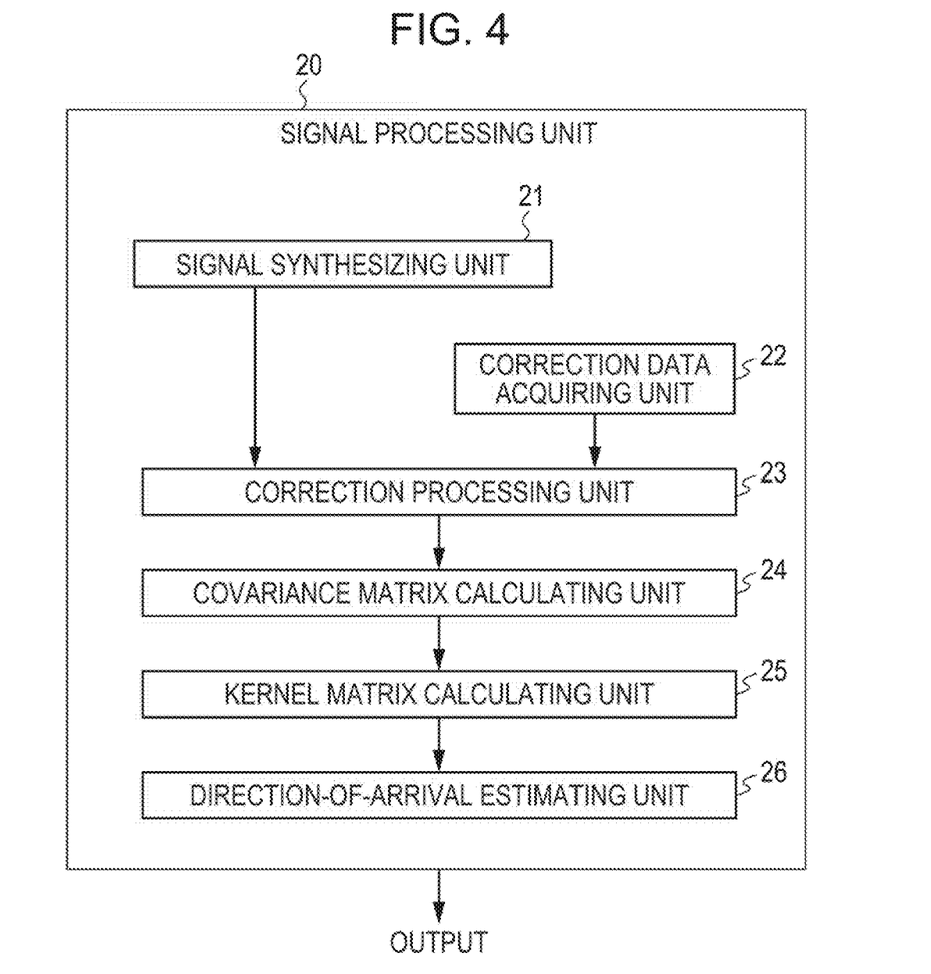
FIG. 4 is a block diagram illustrating a configuration example of a signal processing unit.

FIG. 4 is a block diagram illustrating a configuration example of the signal processing unit 20. As illustrated in FIG. 4, the signal processing unit 20 includes a signal synthesizing unit 21, a correction data acquiring unit 22, a correction processing unit 23, a covariance matrix calculating unit 24, a kernel matrix calculating unit 25, and a direction-of-arrival estimating unit 26. These units are implemented as software components, hardware components, or combinations thereof (refer to [Others]).

As described above, the signal synthesizing unit 21 aperture synthesizes 2N synthesized echo signals acquired through one cycle of the operation in the radar apparatus 1 of this embodiment. The signal synthesizing unit 21 in this case performs an operation of unifying reference points of the phases of the synthesized echo signals. Here, the signal of the reference points are selected from synthesized echo signals acquired by combinations of transmission antennas and reception antennas which may provide an equal spatial phase between two time slots. In other words, the reference points are the synthesized echo signal $v_1^{T1}(t)$ acquired from the antenna $A_{R1}$ at the time slot $[0,T_f]$ and the synthesized echo signal $v_N^{T2}(t)$ acquired from the antenna $A_{RN}$ at the time slot $[T_f, 2T_f]$ in the timing chart in FIG. 2.

The signal synthesizing unit 21 performs the operation of unifying the reference points of the phases by calculating the amount of correction $d\phi(t)$ $(=\arg[v_1^{T1}(t)] - \arg[v_N^{T2}(t)])$, using the amount of correction $d\phi(t)$ and $v_n^{T2}(t)$ to calculate $v_n^{T2}(t) * \exp(jd\phi(t))$ (where n=1 to N), and handling the acquired value as $v_n^{T2}(t)$. As a result, the signal synthesizing unit 21 generates the aperture synthesized echo signal v expressed by Expression (1.5) below. As expressed by Expression (1.5), the synthesized echo signals $v_1^{T1}(t)$ and $v_N^{T2}(t)$ have an equal spatial phase reference and are thus added. As a result, the number of elements of the aperture synthesized echo signal v is equal to (2N−1). The signal synthesizing unit 21 transmits the generated aperture synthesized echo signal to the correction processing unit 23.

$$v = [v_1 \quad \cdots \quad v_{2N-1}]^T \quad (1.5)$$

$$= [v_N^{TX1} \quad \cdots \quad v_2^{TX1} \quad (v_1^{TX1} + v_N^{TX2}) \quad v_{N-1}^{TX2} \quad \cdots \quad v_1^{TX2}]^T$$

The correction data acquiring unit 22 acquires the correction data for correcting the aperture synthesized echo signal, and transmits the correction data to the correction processing unit 23. The correction data is acquired as a correction matrix C or correction vector c having the coefficient ($f_l$) of the synthesized equally-spaced array polynomial corresponding to an order of z (noted below). The coefficient $f_l$ is designed in advance with array polynomials such as Expressions (2.1a), (2.1b) and (2.1c) below on the basis of the parameters of the transmission antennas and reception antennas and is held as an adjustable value in a memory, for example. The parameters of the transmission antennas and reception antennas are designed such that the synthesized array polynomial f(z) of Expression (2.1c) below can exhibit a uniform linear array antenna with an element interval d and the number of elements L. The parameters may be the number of elements, element interval, gain characteristic, phase characteristic and/or the like relating to transmission antennas and reception antennas.

$$g_{TX}(z) = \sum_{k=1}^{K} g_k z^{\eta_k(k-1)} \quad (2.1a)$$

$$h_{RX}(z) = \sum_{n=1}^{N} h_n z^{\mu_n(n-1)} \quad (2.1b)$$

$$f(z) = g_{TX}(z) h_{RX}(z) \quad (2.1c)$$
$$= \sum_{k=1}^{K} \sum_{n=1}^{K} g_k h_n z^{\eta_k(k-1) + \mu_n(n-1)}$$
$$= \sum_{l=1}^{L} f_l z^{l-1}$$

The $\eta_k$ in the expressions above is a coefficient expressing the magnification ratio of the interval of transmission elements about the reference element interval d. The $g_k$ is a complex constant of the gain characteristic or phase characteristic of a transmission antenna or a combination of them. The subscript k indicates an identification number of each transmission antenna and is an integer of 1 to the number of transmission antennas (K). According to this embodiment, the subscript k is 1 or 2. The $\mu_n$ is a coefficient expressing the magnification ratio of the interval of reception elements about the reference element interval d. The $h_n$ is a complex constant of the gain characteristic or phase characteristic of a reception antenna or a combination of them. The subscript n indicates an identification number of each reception antenna and is an integer of 1 to the number of reception antennas (N). According to this embodiment, the subscript n is an integer of 1 to N. The z is defined as $z=\exp(j(2\pi d/\lambda)\sin\theta)$ with a wavelength $\lambda$ of a system reference signal and an arbitrary angle $\theta$ contained in a radar FOV (Field Of View). The L is the number of terms as a result of the organization of the orders of the synthesized array polynomial f(z).

After acquiring the coefficient ($f_l$), the correction data acquiring unit 22 uses it to acquire the correction matrix C or correction vector c. The correction matrix C is expressed by Expression (2.2a) below, and the correction vector c is expressed by Expression (2.2b) below. The correction data acquiring unit 22 transmits the acquired correction data (correction vector c or correction matrix C) to the correction processing unit 23.

$$C = \begin{bmatrix} 1/f_1 & 0 & \cdots & 0 \\ 0 & 1/f_2 & \ddots & \vdots \\ \vdots & \ddots & \ddots & 0 \\ 0 & \cdots & 0 & 1/f_L \end{bmatrix} \quad (2.2a)$$

$$c = [1/f_1 \ \cdots \ 1/f_L]^T \quad (2.2b)$$

The correction processing unit 23 applies the correction data acquired from the correction data acquiring unit 22 to the aperture synthesized echo signal transmitted from the signal synthesizing unit 21 so that the aperture synthesized echo signal can be corrected. More specifically, as expressed in Expression (2.3a) below, the correction processing unit 23 multiplies the aperture synthesized echo signal v with the correction matrix C to correct the aperture synthesized echo signal (refer to Expression (2.3a)). The correction processing unit 23 may acquire an Hadamard product (element-wise product) of the aperture synthesized echo signal v and the correction vector c to correct the aperture synthesized echo signal (refer to Expression (2.3b)). Hereinafter, the signal corrected by the correction processing unit 23 will be called a corrected echo signal. The corrected echo signal is transmitted to the covariance matrix calculating unit 24.

$$W = Cv \quad (2.3a)$$

$$W = C \Theta v \quad (2.3b)$$

The covariance matrix calculating unit 24 calculates a covariance matrix of the corrected echo signal transmitted from the correction processing unit 23. According to this embodiment, the covariance matrix calculation method is not limited. Therefore, it will be described briefly. For example, when MUSIC (Multiple Signal Classification) method is used, a Forward Spatial Smoothing (Forward SS) may be applied to the matrix acquired by the product of the corrected echo signal w and the Hermitian conjugate transposition $w^H$ to acquire a matrix $R_{MUSIC}^{FSS}$. Additionally, a Backward Spatial Smoothing (Backward SS) may be applied to the matrix acquired from the product of the signal vector (Jw*) acquired from the product of the anti-diagonal matrix J and a complex conjugate w* of the corrected echo signal w and Hermitian conjugate transposition $(Jw^*)^H$ to acquire a matrix $R_{MUSIC}^{BSS}$. The covariance matrix calculating unit 24 acquires a matrix acquired by adding the matrix $R_{MUSIC}^{FSS}$ and the matrix $R_{MUSIC}^{BSS}$ and dividing the result by 2 as a covariance matrix $R_{MUSIC}^{FBSS}$. According to PRISM (Propagator-method based on an Improved Spatial-smoothing Matrix) method, a quasi-covariance matrix $R_{PRISM}$ having a generalized Hankel structure is acquired from the corrected echo signal w and a part of the elements. The matrix $R_{PRISM}$ has the same information as a normal covariance used in MUSIC method, for example, but has a different matrix structure. Thus, it will be called a quasi-covariance matrix herein for distinction.

The kernel matrix calculating unit 25 calculates a matrix for angle estimation (hereinafter, called a kernel matrix) from the covariance matrix acquired by the covariance matrix calculating unit 24. The kernel matrix calculation method is not limited according to this embodiment and therefore will be described briefly. When MUSIC method is used as described above, the covariance matrix $R_{MUSIC}^{FBSS}$ undergoes eigenvalue decomposition so that matrix $E_N$ including an eigenvector representing a noise subspace and a matrix $E_S$ including an eigenvector representing a signal subspace can be acquired. Thus, the product of the matrix $E_N$ and the complex conjugate transposition (same as the Hermitian conjugate transposition) of the matrix $E_N$ can be acquired as a kernel matrix $\Omega_{MUSIC}$.

In PRISM method, submatrices $R_1$ and $R_2$ are acquired from the quasi-covariance matrix $R_{PRISM}$ (refer to Expression (2.4a) below), and the submatrices $R_1$ and $R_2$ are used to generate a linear operator $\Gamma$ (refer to Expression (2.4b) below). The superscript $^H$ in Expression (2.4b) below denotes a complex conjugate transposition (same as the Hermitian conjugate transposition also noted above, and the annotation is omitted hereafter). The linear operator $\Gamma$ and a unit matrix $I_{(2N-1)-2M}$ of the ((2N−1)−2M) order are used to generate a propagator matrix $\Pi$, as expressed by Expression (2.4c) below. The M is [(2N−2)/2] by using the Gauss symbol [ ]. The scaling matrix $\Lambda$ is generated from the linear operator $\Gamma$ and submatrix $R_1$ and $R_2$, as expressed by Expression (2.4d) below. Finally, the kernel matrix calculating unit 25 uses the propagator matrix $\Pi$ and scaling matrix $\Lambda$ to calculate the kernel matrix $\Omega_{PRISM}$ by using Expression (2.4e).

$$R_{PRISM} = \begin{bmatrix} R_1 \\ R_2 \end{bmatrix} \quad (2.4a)$$

$$\Gamma = (R_1 R_1^H)^{-1} R_1 R_2^H \quad (2.4b)$$

$$\prod = \begin{bmatrix} \Gamma \\ -I_{(2N-1)-2M} \end{bmatrix} \quad (2.4c)$$

$$\Lambda = R_2 R_2^H - \Gamma^H R_1 R_2^H \quad (2.4d)$$

$$\Omega_{PRISM} = \prod \Lambda^{-1} \prod{}^H \quad (2.4e)$$

MUSIC method and PRISM method which can be used by the covariance matrix calculating unit 24 and kernel matrix calculating unit 25 are well-known methods, and other methods may be used instead. As MUSIC method, a reference document (IEEE Trans. Antennas Propagation, Vol. 34, (March 1986), pp. 276-280) is quoted. As PRISM method, the reference document (IEEE Trans. Intelligent Transportation Systems, Vol. 9, No. 3, (September 2008), pp. 451-461) or the reference document (International Publication Pamphlet No. WO2006/67869, Japanese Patent Application No. 2006-548672) is quoted.

The direction-of-arrival estimating unit 26 uses the kernel matrix calculated by the kernel matrix calculating unit 25 for angle estimation. According to this embodiment, the angle estimation method to be used by the direction-of-arrival estimating unit 26 is not limited. The angle estimation method may be a well-known technology. For example, the kernel matrix calculated by the kernel matrix calculating unit 25 is used to calculate an angle spectrum (refer to Expression (2.5a) or Expression (2.5b) below). The angle spectrum is scanned by parameter θ of the mode vector a(θ) (refer to Expression (2.5c), where the dimension of the kernel matrix is S×S for simple description) so that the angle $\theta_m$ (m=1 to M) of the detection target can be estimated from the value of θ, at which P(θ) takes a peak value.

$$P_{MUSIC}(\theta) = \frac{a^H(\theta)a(\theta)}{a^H(\theta)\Omega_{MUSIC}a(\theta)} \quad (2.5a)$$

$$P_{PRISM}(\theta) = \frac{a^H(\theta)a(\theta)}{a^H(\theta)\Omega_{PRISM}a(\theta)} \quad (2.5b)$$

$$a(\theta) = [1 \quad \exp[j(2\pi d/\lambda)\sin(\theta)] \quad \ldots \quad \exp[j(2\pi d(S-1)/\lambda)\sin(\theta)]]^T \quad (2.5c)$$

Alternatively, the direction-of-arrival estimating unit 26 may solve the algebraic equation defined by (Expression 2.6a) below using the kernel matrix Ω calculated by the kernel matrix calculating unit 25 for angle estimation. When the matrix Ω is a matrix of the (S×S) order, the vector a(z) of Expression (2.6a) can be defined by Expression (2.6c) below. In this case, for example, the value like Expression (2.6b) below is provided as the m-th solution. If the value $|z_m|$ is close to 1, the direction-of-arrival estimating unit 26 uses $\theta_m = \arcsin[(\lambda/(2\pi d))\arg(z_m)]$ as the estimated angle.

$$\alpha(1/z)^T \Omega \alpha(z) = 0 \quad (2.6a)$$

$$z_m = r_m \exp[j(2\pi d/\lambda)\sin\theta_m] \quad (2.6b)$$

$$\alpha(z) = [1, z, \ldots, z^{S-1}]^T \quad (2.6c)$$

[Actions and Effects of Embodiment]

The actions and effects of the radar apparatus 1 according to the aforementioned embodiment will be described below.

In the radar apparatus 1 of the embodiment, in accordance with the timing chart illustrated in FIG. 2, the probe signals radiated from the transmission antenna $A_{T1}$ and $A_{T2}$ are reflected by M detection targets, and the echo signals are thus generated and arrived at the reception antennas $A_{R1}$ to $A_{RN}$. In the radar apparatus 1, the LNA 12, mixer 14, A/D converter 15 and so on operate so that 2N synthesized echo signals are acquired from the echo signals in one cycle operation (time slots [0,$T_f$] and [$T_f$,2 $T_f$] in the example in FIG. 2).

The thus acquired 2N synthesized echo signals are aperture synthesized by the signal synthesizing unit 21 illustrated in FIG. 4. The aperture synthesized echo signal resulting from the aperture synthesis can be expressed by Expression (1.5) above. In this case, when the target echo signal vector x and noise signal vector n are defined as Expression (3.1) and Expression (3.2) below and the angle matrix A is defined by Expressions (3.3) and (3.4), the basic relationship expression of the array signal processing can be derived as in Expression (3.5) below regarding the aperture synthesized echo signal. Thus, the angle matrix A as expressed by Expression (3.3) is used to function the radar apparatus 1 of this embodiment as a radar apparatus having a uniform linear array antenna including (2N−1) reception antennas.

$$x \equiv [x_1 \ldots x_M]^T = [x_1^{T1} \ldots x_M^{T1}]^T \quad (3.1)$$

$$n = [n_1 \ldots n_{2N-1}]^T \quad (3.2)$$
$$= [n_N^{TX1} \ldots n_2^{TX1} \ (n_1^{TX1}+n_N^{TX2}) \ n_{N-1}^{TX2} \ldots n_1^{TX2}]^T$$

$$A \equiv [a(\theta_1) \ldots a(\theta_M)] = \begin{bmatrix} \exp(j\phi_{1,1}) & & \exp(j\phi_{1,M}) \\ & \ddots & \\ 2 & & 2 \\ & \ddots & \\ \exp(j\phi_{2N-1,1}) & & \exp(j\phi_{2N-1,M}) \end{bmatrix} \quad (3.3)$$

$$\varphi_{n,m} \equiv -\frac{2\pi}{\lambda}(N-n)d\sin\theta_m \quad (3.4)$$

$$v(t) = Ax(t) + n(t) \quad (3.5)$$

By the way, Expression (3.3) above has some terms in which the element of the mode vector a(θ) is 2. This is proved from the appearance of 2 as the coefficient of the array polynomial after the aperture synthesis as expressed by Expression (4.3) below. The array polynomial f(z) after the aperture synthesis can be expressed as the product of the array polynomial $g_{TX}(z)$ of the transmission antennas expressed by Expression (4.1) and the array polynomial $h_{RX}(z)$ of the reception antennas expressed by Expression (4.2), where z=exp(j(2πd/λ)sin θ).

$$g_{TX}(z) = 1 + z^{N-1} \quad (4.1)$$

$$h_{RX}(z) = 1 + z + \ldots + z^{N-1} \quad (4.2)$$

$$f(z) = g_{TX}(z)h_{RX}(z) = 1 + z + \ldots + 2z^{N-1} + \ldots + z^{2N-1} \quad (4.3)$$

As described above, the term in which the coefficient is 2 in the array polynomial f(z) after the aperture synthesis means that data measurement is performed twice in the N-th antenna of the uniform linear array after the aperture synthesis. Thus, the same basic relationship expression of the array signal processing as the Expression (3.5) is satisfied even when Expression (1.5) above is Expression (4.4) below and Expression (3.3) above is Expression (4.5) below.

$$v = [\, v_1 \;\; \ldots \;\; v_{N-2} \;\; 2v_{N-1} \;\; v_N \;\; \ldots \;\; v_{2N-1} \,]^T \tag{4.4}$$

$$A \equiv [\, a(\theta_1) \;\; \ldots \;\; a(\theta_M) \,] \tag{4.5}$$

$$= \begin{bmatrix} \exp(j\phi_{1,1}) & \exp(j\phi_{1,M}) \\ \cdot\cdot\cdot & \cdot\cdot\cdot \\ 1 & 1 \\ \cdot\cdot\cdot & \cdot\cdot\cdot \\ \exp(j\phi_{2N-1,1}) & \exp(j\phi_{2N-1,M}) \end{bmatrix}$$

On the basis of the idea, in the radar apparatus 1 according to this embodiment, the aperture synthesized echo signal acquired by the signal synthesizing unit 21 is corrected in the correction processing unit 23 with the correction data acquired by the correction data acquiring unit 22. The correction data is acquired as a correction matrix or correction vector which is set to cancel the coefficients ($f_l$) corresponding to the orders of the synthesized array polynomial being the uniform linear array.

According to this embodiment, in this way, the aperture synthesized echo signal in which the coefficients corresponding to the orders of the synthesized array polynomial being the uniform linear array are cancelled is used to calculate a covariance matrix (by the covariance matrix calculating unit 24), and the kernel matrix is acquired from the covariance matrix (by the kernel matrix calculating unit 25). As a result, from the thus acquired kernel matrix, the direction-of-arrival estimating unit 26 performs angle estimation.

Figure 5:
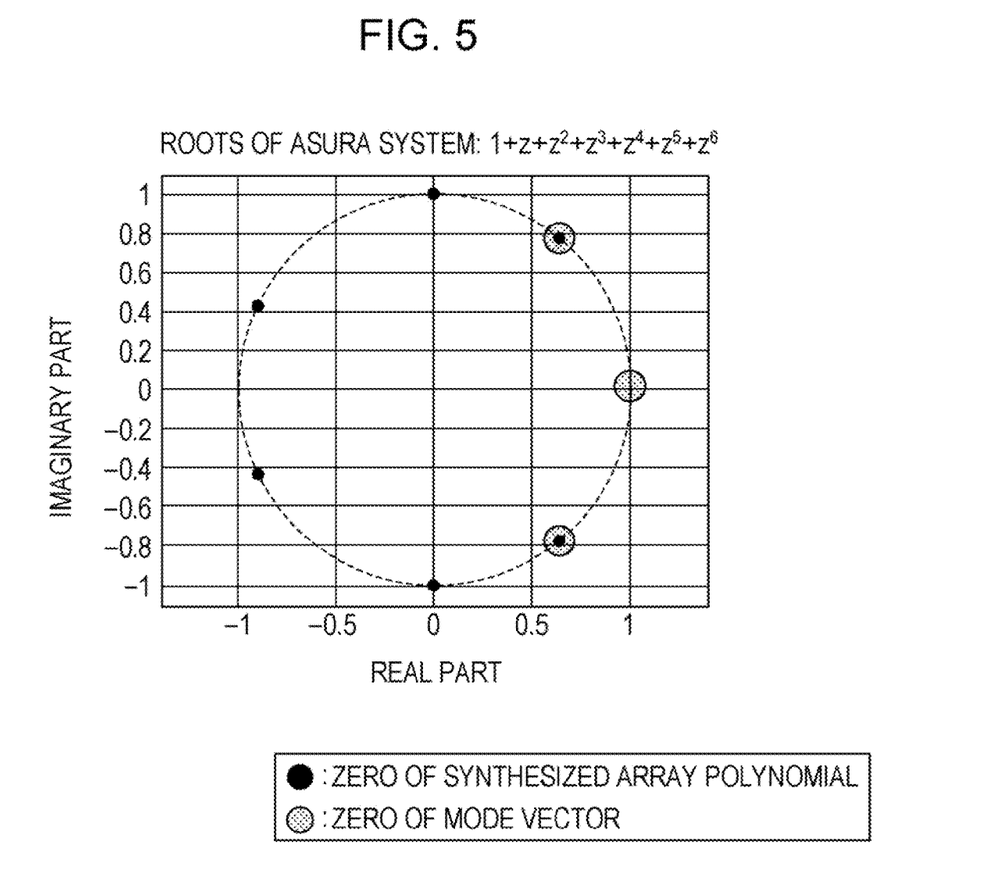
FIG. 5 illustrates a positional relationship between zeros of a synthesized array polynomial in this embodiment and zeros of a mode vector on a Gaussian plane.

FIG. 5 illustrates a positional relationship between zeros of a synthesized array polynomial in this embodiment and zeros of a mode vector on a Gaussian plane. FIG. 5 illustrates an example in which the number of transmission antennas is equal to 2, and the number of reception antennas N is equal to 4. According to this embodiment, zeros (black circles illustrated in FIG. 5) of a synthesized array polynomial is located equally spaced on the circumference. The zeros (gray circles illustrated in FIG. 5) of the mode vector (refer to Expression (2.5c) above) which move in an interlocking manner on the Gaussian plane in accordance with the value of the parameter θ and are to be used for angle spectrum scanning are matched with a plurality of zeros of the synthesized array polynomial.

This means that phase relation between the synthesized array polynomial and the mode vectors is consistent.

By the way, unlike the radar apparatus 1 of this embodiment, some radar apparatuses perform angle estimation without correction of aperture synthesized echo signals as in this embodiment by the correction data acquiring unit 22 and correction processing unit 23. Hereinafter, this type of radar apparatus will be called a comparison radar apparatus, and angle estimation processing in the comparison radar apparatus will be described below.

The signal vector to be used in the angle estimation processing in the comparison radar apparatus may be given by Expression (5.1) below, for example, where the number of reception antennas N is equal to 3 (2N−1=5), for example. The comparison radar apparatus uses aperture synthesized echo signals which are not corrected as in Expression (5.1) below.

Here, MUSIC method is applied as an angle estimating algorithm, the signal vector in Expression (5.1) is used to generate a covariance matrix $R_{MUSIC}$ as in Expression (5.2) below. A Forward Spatial Smoothing is applied to the covariance matrix $R_{MUSIC}$ to acquire the covariance matrix $R_{MUSIC}^{FSS}$ as in Expression (5.3) below. A covariance matrix is acquired for the product $Jv^*$ of the anti-diagonal matrix $J$ and the complex conjugate of $v$. The matrix $R_{MUSIC}^{BSS}$ is further acquired as a result of the application of a Backward Spatial Smoothing to the covariance matrix, and the matrix $R_{MUSIC}^{FBSS}$ of Expression (5.4) below is acquired as the covariance matrix to be used for angle estimation. The thus acquired covariance matrix $R_{MUSIC}^{FBSS}$ undergoes eigenvalue decomposition as expressed by Expression (5.4) below to acquire a matrix $E_N$ including an eigenvector representing a noise subspace and a matrix $E_S$ including an eigenvector representing a signal subspace. The product of the matrix $E_N$ and the complex conjugate transposition of the matrix $E_N$ is acquired as a kernel matrix $\Omega_{MUSIC}$ (refer to Expression (5.5)). As a result, the kernel matrix $\Omega_{MUSIC}$ is used for the angle estimation.

$$v = [\, v_1 \;\; v_2 \;\; 2v_3 \;\; v_4 \;\; v_5 \,]^T \tag{5.1}$$

$$R_{MUSIC} = vv^H = \begin{bmatrix} |v_1|^2 & v_1 v_2^* & 2v_1 v_2^* & v_1 v_4^* & v_1 v_5^* \\ v_2 v_1^* & |v_2|^2 & 2v_2 v_3^* & v_2 v_4^* & v_2 v_5^* \\ 2v_3 v_1^* & 2v_3 v_2^* & 4|v_3|^2 & 2v_3 v_4^* & 2v_3 v_5^* \\ v_4 v_1^* & v_4 v_2^* & 2v_4 v_3^* & |v_4|^2 & v_4 v_5^* \\ v_5 v_1^* & v_5 v_2^* & 2v_5 v_3^* & v_5 v_4^* & |v_5|^2 \end{bmatrix} \tag{5.2}$$

$$R_{MUSIC}^{FSS} = \frac{1}{3} \begin{bmatrix} |v_1|^2 + |v_2|^2 + 4|v_3|^2 & v_1 v_2^* + 2v_2 v_3^* + 2v_3 v_4^* & 2v_1 v_3^* + v_2 v_4^* + 2v_3 v_5^* \\ v_2 v_1^* + 2v_3 v_2 + 2v_4 v_3^* & |v_2|^2 + 4|v_3|^2 + |v_4|^2 & 2v_2 v_3^* + 2v_3 v_4^* + v_4 v_5^* \\ 2v_3 v_1^* + v_4 v_2^* + 2v_5 v_3^* & 2v_3 v_2^* + 2v_4 v_3^* + v_5 v_4^* & 4|v_3|^2 + |v_4|^2 + |v_5|^2 \end{bmatrix} \tag{5.3}$$

$$R_{MUSIC}^{FBSS} = \frac{1}{2}(R_{MUSIC}^{FSS} + R_{MUSIC}^{BSS}) = E_S \Lambda_S E_S^H + \sigma^2 E_N E_N^H \tag{5.4}$$

$$\Omega_{MUSIC} = E_N E_N^H \tag{5.5}$$

On the other hand, when PRISM method is applied as the angle estimating algorithm, the signal vector in Expression (5.1) is used to generate a quasi-covariance matrix $R_{PRISM}$ as in Expression (5.6) below. The quasi-covariance matrix $R_{PRISM}$ is used to generate the kernel matrix $\Omega_{PRISM}$ with Expression (2.4b), Expression (2.4c), Expression (2.4d) and Expression (2.4e) above. As a result, the kernel matrix $\Omega_{PRISM}$ is used for performing angle estimation.

$$R_{PRISM} = \begin{bmatrix} v_2v_1^* & 2v_3v_1^* & v_1v_5^* & v_2v_5^* & v_5v_2^* & v_5v_1^* & 2v_1v_3^* & v_1v_2^* \\ 2v_3v_1^* & v_4v_1^* & v_2v_5^* & 2v_3v_5^* & 2v_5v_3^* & v_5v_2^* & v_1v_4^* & 2v_1v_3^* \\ v_4v_1^* & v_5v_1^* & 2v_3v_5^* & v_4v_5^* & v_5v_4^* & 2v_5v_3^* & v_1v_5^* & v_1v_4^* \end{bmatrix} = \begin{bmatrix} R_1 \\ R_2 \end{bmatrix} \quad (5.6)$$

In this way, a covariance matrix used in the comparison radar apparatus includes an element multiplied by a coefficient even when any one of angle estimating algorithms is applied. Multiplying an element of a covariance matrix by a coefficient may result in an eigenvalue, which is different from the actual (or ideal) eigenvalue, as a result of the eigenvalue decomposition on the matrix for example. Thus, the change in eigenvector may lower the precision of angle estimation.

Figure 6:
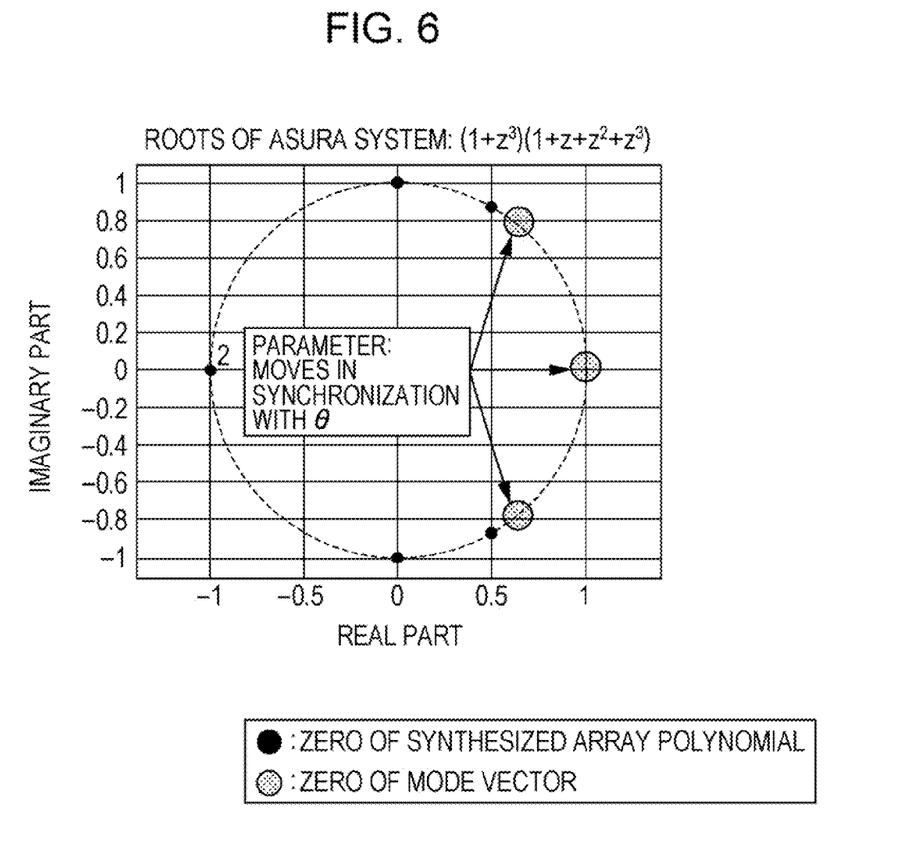
FIG. 6 illustrates a positional relationship between zeros of a synthesized array polynomial in a comparison radar apparatus and zeros of a mode vector on a Gaussian plane.

FIG. 6 illustrates a positional relationship between zeros of a synthesized array polynomial in a comparison radar apparatus and zeros of a mode vector on a Gaussian plane. FIG. 6 illustrates an example in which the number of transmission antennas is equal to 2 and the number of reception antennas N is equal to 4, like FIG. 5. As illustrated in FIG. 6, the array polynomial after the aperture synthesis in the comparison radar apparatus is described by Expression (4.3) being different from a cyclotomic polynomial, the zeros are not uniformly positioned unlike those shown in FIG. 5, and a multiple root (black point with the number "2" in FIG. 6) is also appearing. This exhibits that the inconsistent phase relation between the synthesized array polynomial and the mode vector are derived and means that scanning with the mode vector may be influenced by a close zero and/or a multiple root and that a phenomenon may occur in which the dynamic range of the angle spectrum may be deteriorated.

Figure 7:
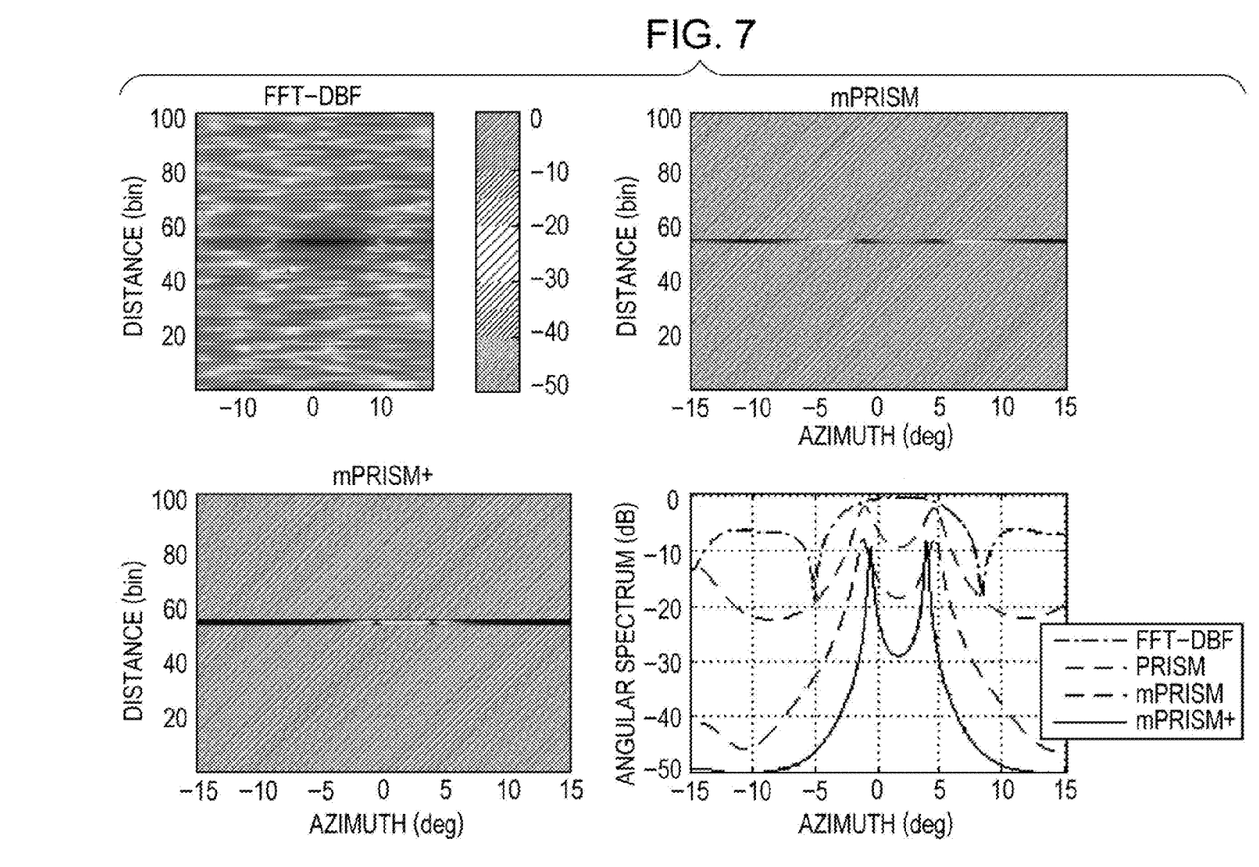
FIG. 7 is a graph illustrating angle estimation precision.

FIG. 7 is a graph illustrating angle estimation precision. FIG. 7 illustrates the angle estimation precision by a comparison radar apparatus and by the radar apparatus 1 of this embodiment both including aperture synthesis array antennas where the number of transmission antennas K is equal to 2, the number of reception antennas N is equal to 4, and the reference antenna interval d is equal to 1.8λ. Furthermore, an FMCW signal is used which has a carrier frequency of 76 GHz, a one-side modulation band width of 50 MHz and a modulation cycle of 4 msec. Two detection targets T1 and T2 are set which have the target specifications (distance, speed and angle) below. The SNR is set to 20 dB.

T1: 40 m, 0 km/h, 0 degree
T2: 40 m, 0 km/h, 3 degrees

On the three graphs excluding the lower right one in FIG. 7, the angle spectrum level is colored about the Z-axis with respect to angle estimating algorithms on the plane formed by an angle (X-axis) and a distance (Y-axis). The graph under the title FFT-DBF illustrates a result of the application of Digital Beam Former ((DBF) using Fourier transform) method as an angle estimating algorithm in the comparison radar apparatus. The graph under the title mPRISM illustrates a result of the application of an improved PRISM method quoted by the reference document (Japanese Patent Application No. 2009-201624) as an angle estimating algorithm in the comparison radar apparatus. On the other hand, the graph under the title mPRISM+ illustrates a result of the application of an improved PRISM method quoted by the reference document (Japanese Patent Application No. 2009-201624) as an angle estimating algorithm in the radar apparatus 1 of this embodiment. The lower right graph illustrates levels of angle spectrums in a distance where detection targets exist in four situations including the three situations described above.

As illustrated in the lower right graph of FIG. 7, the angle estimation in the comparison radar apparatus has an error of about two degrees in estimation precision while the angle estimation in the radar apparatus 1 in this embodiment is improved to an error of about one degree. In other words, the angle estimation in the radar apparatus 1 according to this embodiment has improved angle estimation precision compared with the angle estimation in the comparison radar apparatus. As illustrated in the graphs in FIG. 7, the angle estimation in the radar apparatus 1 according to this embodiment allows clear distinction between the two detection targets while the angle estimation in the comparison radar apparatus lacks the clarity. In other words, the improved angle spectrum dynamic range helps easy identification of detected targets using the radar apparatus 1 according to this embodiment, when compared with the comparison radar apparatus.

In this way, the radar apparatus 1 of this embodiment corrects the aperture synthesized echo signal with the coefficients corresponding to the orders of the synthesized array polynomial being the uniform linear array for higher angle estimation precision and an improved dynamic range of an angle spectrum. Thus, the radar apparatus 1 of this embodiment allows more precise estimation of the angle and distance of a detection target.

[Variation Examples]

According to the aforementioned embodiment, a coefficient $f_l$ which is held in advance in a memory, for example, as an adjustable value is used for correcting an aperture synthesized echo signal. However, the embodiment is not limited to the configuration, but the coefficient $f_l$ may be updated by the power levels of synthesized echo signals.

Figure 8:
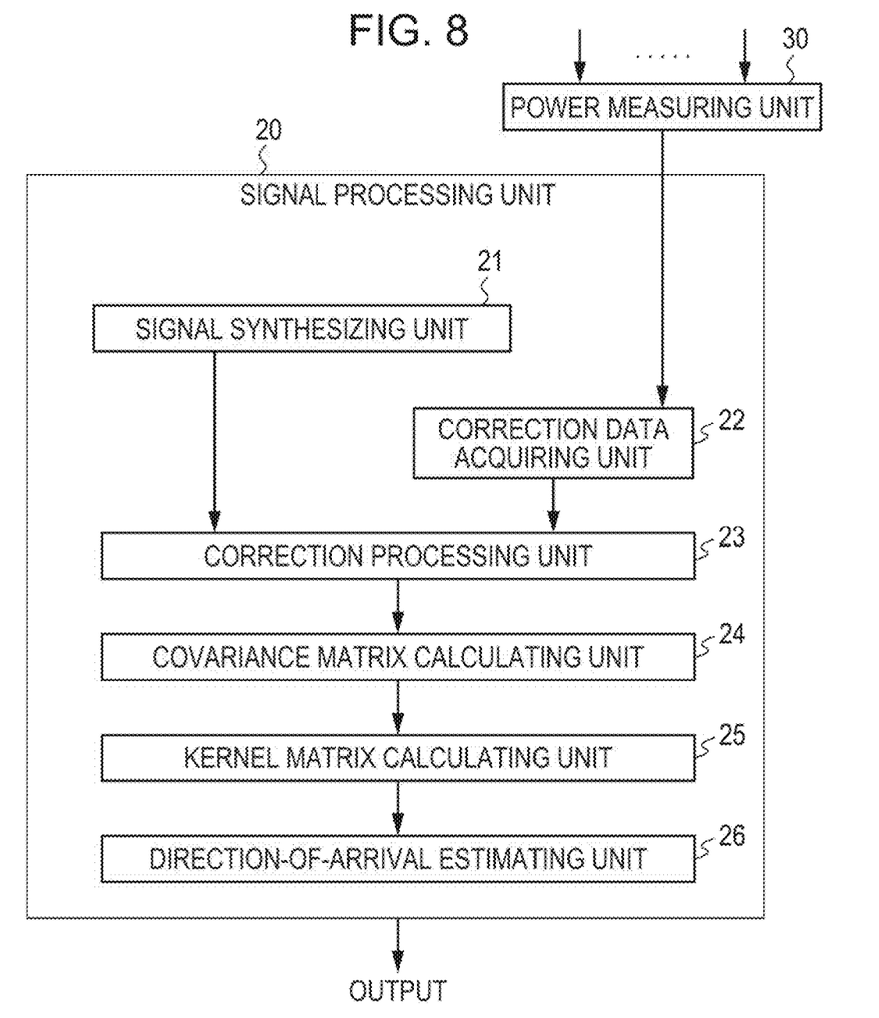
FIG. 8 is a block diagram illustrating a configuration example of a radar apparatus according to a variation example.

FIG. 8 is a block diagram illustrating a configuration example of a radar apparatus according to a variation example. The radar apparatus according to this variation example further includes a power measuring unit 30 which measures the power levels of synthesized echo signals acquired from A/D converters 15 in addition to the configuration of the aforementioned embodiment. The power measuring unit 30 measures the power levels of synthesized echo signals and calculates the proportions of the power levels of synthesized echo signals to a total of values of the power levels of all synthesized echo signals. The power level measurement by the power measuring unit 30 only requires the application of a well-known technology such as Fourier transform and a square detector, and the description will be omitted.

According to this variation example, the correction data acquiring unit 22 acquires the proportion values calculated by the power measuring unit 30 and multiplies the acquired proportion values by the coefficient $f_l$ of a term of a synthesized polynomial held in advance in a memory to determine the latest coefficient $f_l$. In this case, among terms of synthesized polynomials, the coefficient of the term corresponding to an aperture synthesized echo signal is multiplied by the proportion value corresponding to the aperture synthesized echo signal. The correction data acquiring unit 22 uses the thus determined latest coefficient $f_l$ to acquire a correction vector or correction matrix.

This allows real-time update of the coefficient to be used for correction of an aperture synthesized echo signal in accordance with the reception condition of an echo signal. Therefore, angle estimation with higher precision can be implemented.

[Others]

[Regarding Hardware Components and Software Component]

Each of the hardware components here refers to a hardware circuit such as a field programmable gate array (FPGA), an application-specific integrated circuit (ASIC), a gate array, a combination of logic gates, a signal processing circuit, and an analog circuit.

Each of the software components here refers to a part (piece) which implements the aforementioned processes in software, and the concept does not limit the language, development environment and so on for implementing the software. The software components may be a task, a process, a thread, a driver, a firmware, a database, a table, a function, a procedure, a subroutine, a predetermined part of program code, a data structure, an array, a variable, and/or a parameter, for example. These software components may be implemented on one or a plurality of memories within a computer or may be implemented by the execution of data in one or a plurality of memories by one or a plurality of processors (such as a CPU (Central Processing Unit) and a DSP (Digital Signal Processor)).

The aforementioned embodiments do not limit the method for implementing the aforementioned processing units or units. Each of the processing units or units may only be required to configure by a method which can be implemented by a common person skilled in the technical field as a hardware component or software component or the combination of them.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A radar apparatus comprising:
    an array antenna having a plurality of antenna elements, each of the plurality of antenna elements being configured to perform at least one of radiating a probe signal at a predetermined timing and receiving an echo signal which is a reflection of the probe signal from a target;
    a converter configured to convert the echo signal to a baseband signal; and
    a processor configured to:
    generate a synthesized baseband signal vector by performing aperture synthesis of the baseband signal using a combination of a first antenna element and a second antenna element among the plurality of antenna elements, the first antenna element radiating the probe signal, the second antenna element receiving the echo signal, and the combination giving an equal spatial phase in different timings,
    acquire correction data based on coefficients of terms of a synthesized array polynomial obtained from product of an array polynomial of the first antenna element and an array polynomial of the second antenna element,
    correct the synthesized baseband signal vector in accordance with the correction data, and
    perform angle estimation of the target in accordance with the corrected synthesized baseband signal vector.

2. The radar apparatus according to claim 1, wherein:
    the correction data is a correction matrix or correction vector including the reciprocals of the coefficients of the terms of the synthesized array polynomial; and
    the processor is configured to correct the synthesized baseband signal vector in accordance with the product of the synthesized baseband signal vector and the correction matrix, or the Hadamard product of the synthesized baseband signal vector and the correction vector.

3. The radar apparatus according to claim 1, further comprising:
    the processor is configured to:
    measure the power level of the received echo signal, and
    update the coefficients of the terms of the synthesized array polynomial in accordance with the power level.

4. A target detection method comprising:
    receiving with a second antenna element among a plurality of antenna elements included in an array antenna, an echo signal which is a reflection of a probe signal by a target, the probe signal being radiated from a first antenna element among the plurality of antenna elements at a predetermined timing, each of the plurality of antenna elements being configured to perform at least one of radiating the probe signal and receiving the echo signal;
    converting the echo signal to a baseband signal;
    generating, by a processor, a synthesized baseband signal vector by performing aperture synthesis of the baseband signal using a combination of a first antenna element and a second antenna element among the plurality of antenna elements, the first antenna element radiating the probe signal, the second antenna element receiving the echo signal, and the combination giving an equal spatial phase in different timings;
    acquiring correction data based on coefficients of terms of a synthesized array polynomial obtained from product of an array polynomial of the first antenna element and an array polynomial of the second antenna element;
    correcting the synthesized baseband signal vector in accordance with the correction data; and
    performing angle estimation of the target in accordance with the corrected synthesized baseband signal vector.

* * * * *